(12) United States Patent
Zhang et al.

(10) Patent No.: US 9,313,392 B2
(45) Date of Patent: Apr. 12, 2016

(54) SHUTTER RELEASE USING SECONDARY CAMERA

(71) Applicant: OMNIVISION TECHNOLOGIES, INC., Santa Clara, CA (US)

(72) Inventors: Guangbin Zhang, Cupertino, CA (US); Weihua Xiong, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/591,502

(22) Filed: Jan. 7, 2015

(65) Prior Publication Data

US 2015/0124115 A1 May 7, 2015

Related U.S. Application Data

(63) Continuation of application No. 13/493,263, filed on Jun. 11, 2012, now Pat. No. 8,957,973.

(51) Int. Cl.
*H04N 5/228* (2006.01)
*H04N 5/225* (2006.01)
*H04N 5/232* (2006.01)

(52) U.S. Cl.
CPC ......... *H04N 5/2258* (2013.01); *H04N 5/23216* (2013.01); *H04N 5/23219* (2013.01); *H04N 5/23222* (2013.01); *H04N 5/23293* (2013.01)

(58) Field of Classification Search
CPC .......... H04N 5/23248; H04N 5/23264; H04N 5/23267
USPC ................. 348/208.99, 208.4, 208.6, 333.01, 348/208.1
See application file for complete search history.

(56) References Cited

U.S. PATENT DOCUMENTS

| | | | |
|---|---|---|---|
| 7,671,916 B2 | 3/2010 | Hashimoto | |
| 8,670,002 B2 | 3/2014 | Kim et al. | |
| 2004/0155870 A1 | 8/2004 | Middleton | |
| 2007/0081796 A1 | 4/2007 | Fredlund et al. | |
| 2008/0089587 A1 | 4/2008 | Kim et al. | |
| 2008/0220809 A1 | 9/2008 | Hansen | |
| 2009/0027337 A1 | 1/2009 | Hildreth | |
| 2009/0303176 A1 | 12/2009 | Chen et al. | |
| 2010/0265344 A1 | 10/2010 | Velarde et al. | |
| 2011/0187811 A1* | 8/2011 | Kim et al. | 348/14.01 |
| 2012/0162450 A1 | 6/2012 | Park et al. | |
| 2012/0281129 A1 | 11/2012 | Wang et al. | |
| 2013/0021491 A1* | 1/2013 | Lee | H04N 19/56 348/222.1 |
| 2013/0329074 A1 | 12/2013 | Zhang et al. | |
| 2014/0211991 A1* | 7/2014 | Stoppa et al. | 382/103 |

OTHER PUBLICATIONS

TW Application No. 101132605—Office Action and Search Report, mailed May 12, 2014 (4 pages).
CN Application No. 201310190039.X—First Chinese Office Action and Search Report with English Translation, mailed Feb. 3, 2016, 16 pages.

* cited by examiner

*Primary Examiner* — Sinh Tran
*Assistant Examiner* — Zhenzhen Wu
(74) *Attorney, Agent, or Firm* — Blakely Sokoloff Taylor & Zafman LLP

(57) ABSTRACT

Capturing a target image includes activating a first image sensor for capturing the target image. A sequence of images is captured with a second image sensor while the first image sensor remains activated. A determination is made as to whether the sequence of images captured by the second image sensor includes a shutter gesture while the first image sensor remains activated. If a shutter gesture is included in the sequence of images captured by the second image sensor, the first image sensor captures the target image in response.

15 Claims, 5 Drawing Sheets

SHUTTER RELEASE USING SECONDARY CAMERA

CROSS REFERENCE TO RELATED APPLICATION

This application is a Continuation and claims priority to U.S. application Ser. No. 13/493,263, filed Jun. 11, 2012, now pending, which is hereby incorporated by reference.

TECHNICAL FIELD

This disclosure relates generally to optics, and in particular but not exclusively, relates to digital imaging.

BACKGROUND INFORMATION

In many photography scenarios, it is advantageous to keep a camera as still as possible. Without a tripod or other support, a photographer's own movement can compromise the image quality of the photograph. Even pressing a physical button or software generated virtual button (such as on a touch screen interface) may move the camera enough to negatively impact the photograph. This problem can be referred to as hand shaking or camera shake. Camera shake can be problematic with dedicated cameras and with mobile devices (e.g. tablets and smartphones) that have an on-board camera.

FIG. 1 illustrates a mobile device 103 that has an image capture button 155 for initiating an image capture of scene 125 using a digital image sensor (not shown) on the backside of mobile device 103. In FIG. 1, the digital image sensor on the backside of mobile device 103 is activated and is transmitting its field of view as scene 125 on the display of the mobile device. Circuitry within mobile device 103 is displaying image capture button 150 as a virtual button to a user as an alternative to a physical button or switch, such as image capture button 155. The user may press image capture button 150 in order to initiate an image capture of scene 125. Regardless of whether the user initiates the image capture with image capture button 150 or image capture button 155, the user's touch from pressing the image capture button may move the camera slightly, which may cause unwanted effects (e.g. blurring) in the captured image.

Many solutions have been proposed and marketed to address this problem. In one solution, the camera shake caused by a user pressing an image capture button is mitigated by delaying the image capture until after the initial impact of the user pressing image capture button 150 or 155. However, delaying the image capture may cause the user to miss photographing the desired scene or subject, especially in an action shot. Another solution to the camera shake problem is to have a separate device (e.g. remote control) send a wireless/remote shutter signal to the camera. The remote shutter signal allows a camera to initiate an image capture without being physically impacted. Among the drawbacks of this solution are the added expense of the additional hardware of the remote control, the inconvenience of controlling two devices together at the same time, and the impracticability of taking the camera out of the user's hand.

Some devices mitigate the camera shake problem with an anti-shake algorithm that computes the motion estimation between two or more consecutive frames and compensates for the motions between the frames. One disadvantage of this solution is the need for a buffer to store the frames needed to compensate for the motion between the frames. Another disadvantage of this solution is the extra processing resources and corresponding electrical power that may be used in processing. One final potential disadvantage of this solution is that the image quality of the image created by the anti-shake algorithm may be degraded if the motion between frames is estimated inaccurately. Given the drawbacks of the conventional solutions, it would be advantageous to have a solution that did not utilize an image capture time delay, did not include substantial additional hardware and did not require intensive processing and substantial power resources.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Examples of a system and method for initiating an image capture with a first image sensor using an image or images from a second image sensor are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "an example" means that a particular feature, structure, or characteristic described in connection with the example is included in at least one example of the present invention. Thus, the appearances of the phrases "in one example" or "in an example" in various places throughout this specification are not necessarily all referring to the same example. Furthermore, the particular features, structures, or characteristics may be combined in any suitable manner in one or more examples. In this disclosure, it shall be appreciated that the term "shutter" may be in reference to an electronic shutter (e.g. rolling or global shutter of electronic pixels), a mechanical shutter, or both an electronic shutter and a mechanical shutter used in combination to capture image light.

Figure 1:
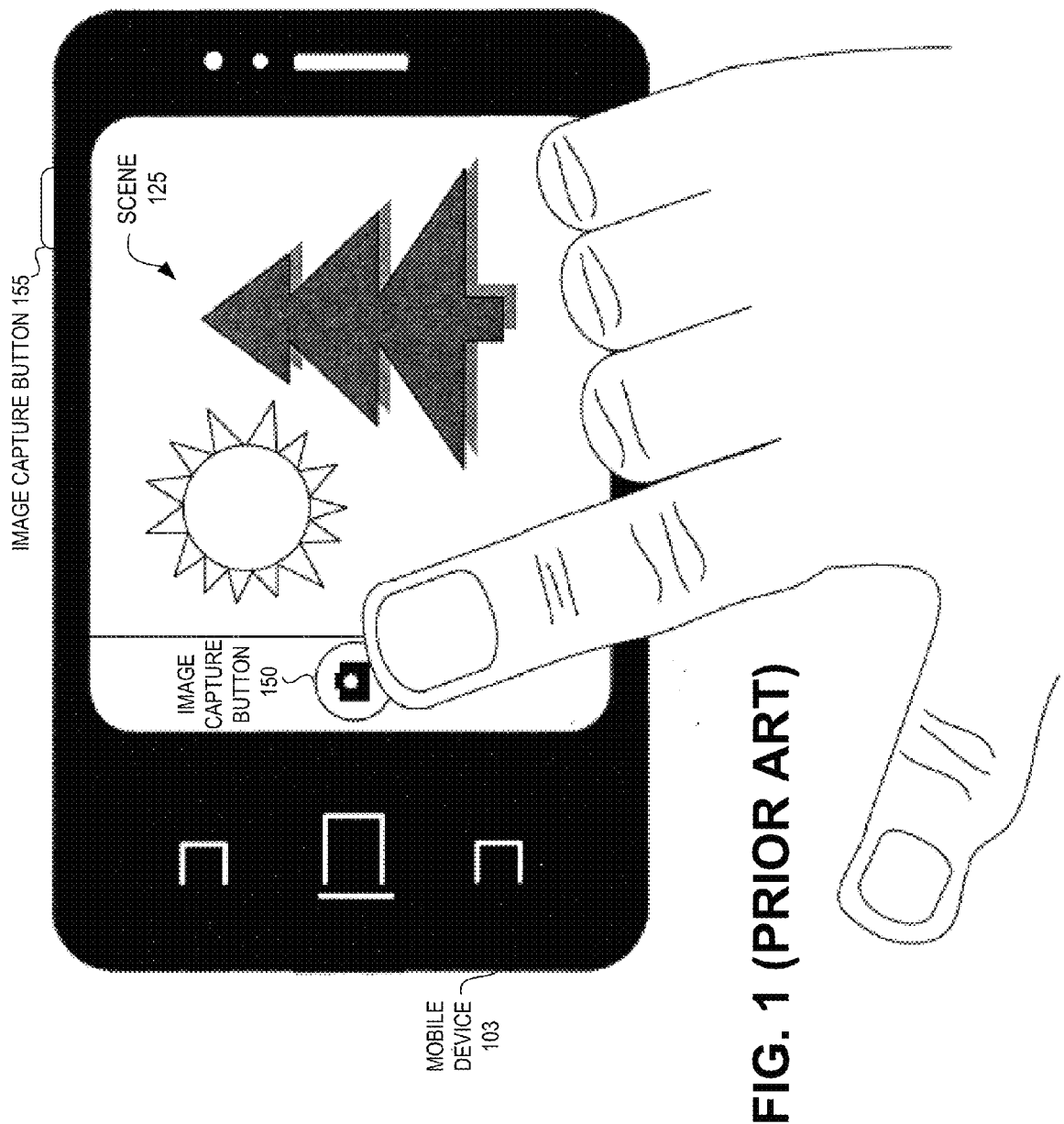
FIG. 1 illustrates a user interacting with a mobile device with image capture buttons for initiating an image capture by a camera of the mobile device.
Figure 2:
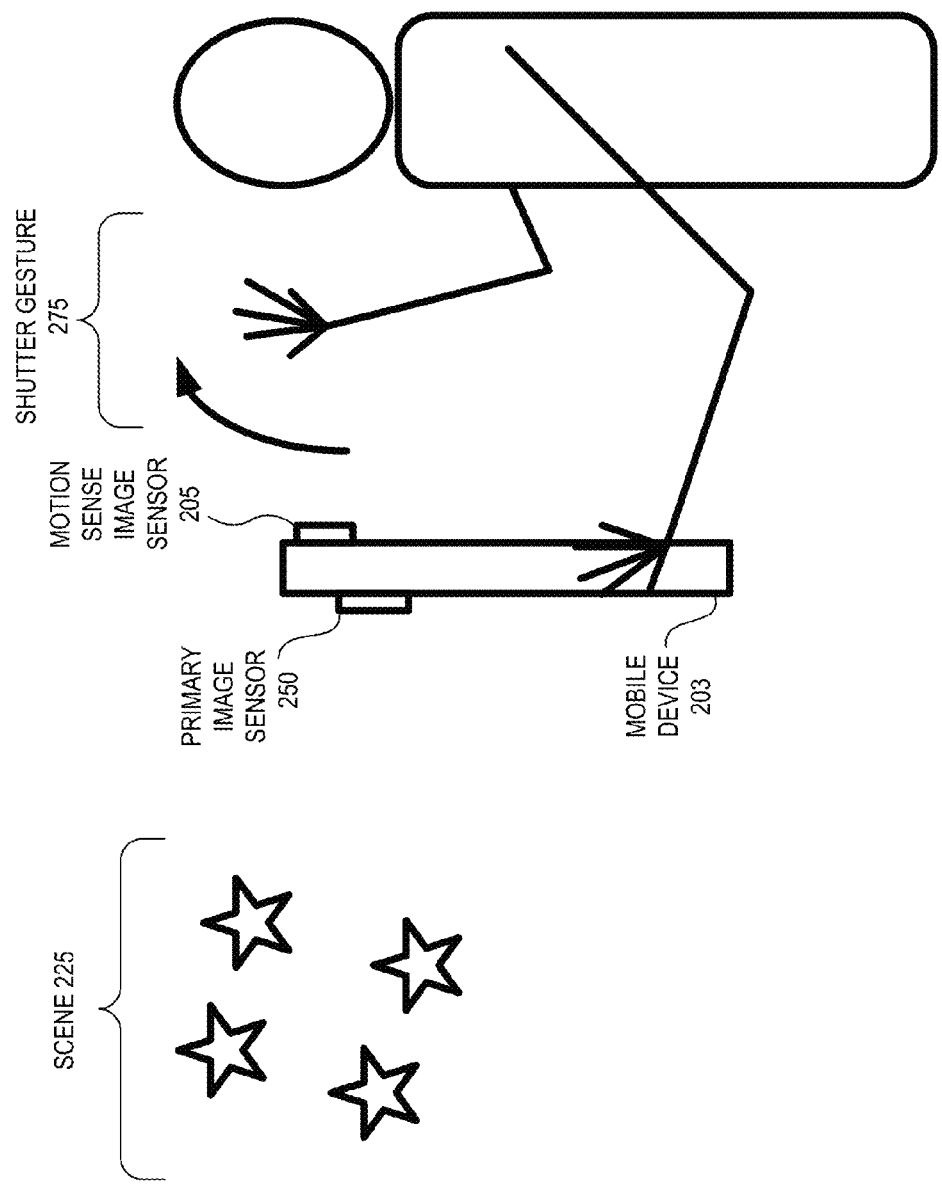
FIG. 2 illustrates a user gesturing in the field of view of a motion sense image sensor of a mobile device to initiate an image capture with a primary image sensor of the mobile device, in accordance with the teachings of the present invention.

FIG. 2 illustrates a user holding mobile device 203, in accordance with the teachings of the present invention. Mobile device 203 includes motion sense image sensor 205 and a primary image sensor 250. As discussed above, a conventional image capture includes pushing a physical button/switch or pressing a virtual button presented to a user by a display with a touch screen. Of course, the conventional methods include touching the camera, which may create the problem of camera shake that negatively affects the images being captured.

In FIG. 2, the user holds mobile device 203 in order to capture an image of scene 225 with primary image sensor 250. Instead of physically contacting mobile device 203 to initiate an image capture with primary image sensor 250, the user may signal an image capture pattern to initiate the image capture. In one example, motion sense image sensor 205 captures a sequence of images (two or more images) to determine if the user is conveying a shutter gesture 275 to initiate an image capture. If the sequence of images contains shutter gesture 275, then primary image sensor 250 captures an image. In one example, the image capture pattern can be a hand signal such as holding up a particular number of fingers in the field of view of motion sense image sensor 205.

Many mobile devices such as tablets and smartphones contain a high resolution (e.g. 8 mega pixels) rear facing camera that is favored for taking photographs. Many mobile devices also have a front facing camera that sometimes has a lower pixel resolution (e.g. 1.3 mega pixels) than the rear facing camera. The front facing camera is often mounted facing the opposite direction as the rear facing camera and the same direction as a display of the mobile device (e.g. liquid crystal display or active-matrix organic light emitting diode) to enable video teleconferencing or similar applications. However, the disclosure is not limited to a device that contains only two image sensors, nor is it limited to a device that has two image sensors facing substantially opposite directions.

In the illustrated example of FIG. 2, it may be advantageous to have primary image sensor 250 be a rear facing higher resolution image sensor and to have motion sense image sensor 205 be a lower resolution. Having a lower resolution image sensor as the image sensor that images an image capture pattern such as shutter gesture 275 may save power and a higher resolution image sensor may not be necessary to effectively sense a user's shutter gesture. Additionally, it may be advantageous to have motion sense image sensor 205 be on the same side of mobile device 203 as a display of the mobile device so the display can present the user with scene 225, which is in the field of view of primary image sensor 250.

Figure 3:
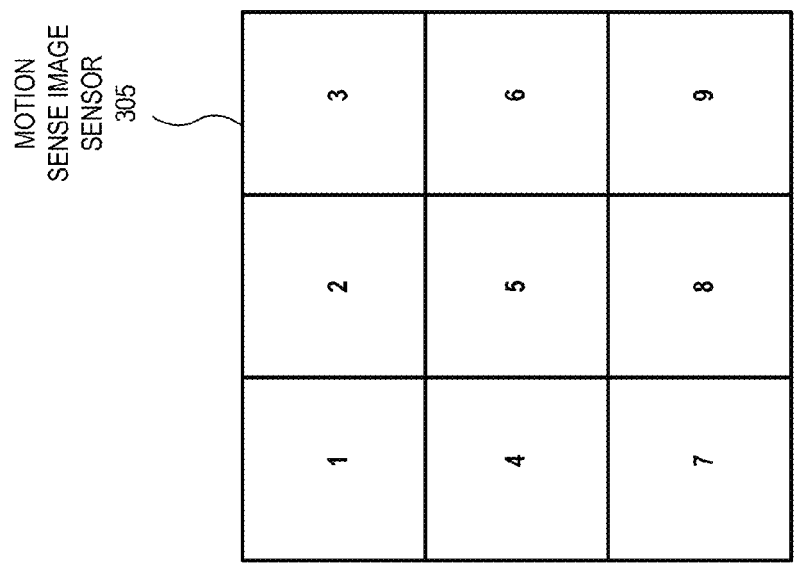
FIG. 3 illustrates a three by three matrix of sectors of an example motion sense image sensor and corresponding shutter vectors, in accordance with the teachings of the present invention.
Figure 3:
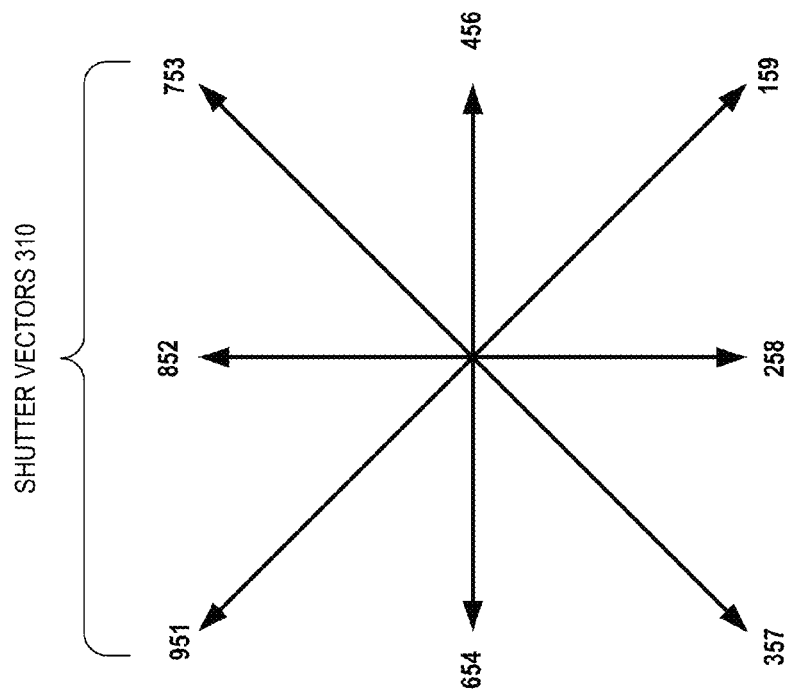

FIG. 3 illustrates a three by three matrix of sectors of an example motion sense image sensor and corresponding shutter vectors, in accordance with the teachings of the present invention. In the illustrated example, motion sense image sensor 305 includes nine sectors or zones and the nine sectors are arranged in a three by three matrix. However, motion sense image sensor 305 may include sectors arranged in a two by two matrix, a four by four matrix, or even larger matrices. Additionally, the sectors may be arranged in a two by three matrix, or otherwise. Furthermore, the arrangement of the sectors may be rearranged or reconfigured by firmware that controls motions sense image sensor 305. It is appreciated that the sectors may simply be a firmware's partitioning of the pixels in motion sense image sensor 305 and that the sectors can be reconfigured in firmware without physically altering motion sense image sensor 305. Motion sense image sensor 305 may include red, green, and blue filters to generate color images or motion sense image sensor 305 may generate grayscale images.

FIG. 3 also includes shutter vectors 310 that correspond with the three by three matrix that corresponds with motion sense image sensor 305. It is appreciated that motion sense image sensor 305 may be an example of motion sense image sensor 205. When motion sense image sensor 305 captures a sequence of images to be analyzed for a shutter gesture (e.g. shutter gesture 275), the sequence may be analyzed according to shutter vectors 310. For example, if the sequence of images includes three images and the images show the user's hand in sector 4 in the first image, sector 5 in the second image, and sector 6 in the third image, then the user's hand has gestured to match vector 456. Similarly, if the user's hand is in sector 1 in the first image, sector 5 in the second image, and sector 9 in the third image, then the user's hand has gestured to match vector 159.

In one example, the shutter gesture can be programmed into mobile device 203 by the user. For example, a right handed user may want the shutter gesture to be vector 357, while a left handed user may want the shutter gesture to be vector 159. In addition, different gestures may indicate different shutter commands. For example, one gesture may generate a shutter signal that captures a single image with primary image sensor 250, while a different gesture may generate a series of shutter signals that capture a burst of images (e.g. five images within a predefined time period). In one example, one shutter signal causes primary image sensor 250 to capture multiple images. In one example, a shutter gesture may generate a shutter signal that includes a corresponding exposure period. In one example, a first shutter gesture or image capture pattern generates a shutter signal that corresponds with a 10 ms pixel exposure time and a second shutter gesture or image capture pattern corresponds with a 100 ms pixel exposure time.

It is appreciated that the illustrated example in FIG. 3 is just an example of how gestures could initiate an image capture by a camera. Other examples are possible including gesturing the letter "Z" (vector 1235789), the letter "N" (vector 7415963), or otherwise. Additionally, motion sense image sensor 305 may image objects or body zones (e.g. eyes or hands) of the user and pass an image or images to control logic to determine if a shutter gesture or image capture pattern is present in the image or images. As briefly discussed above, an image capture pattern such as a hand signal (e.g. "thumbs up" or "peace sign") may be used to initiate an image capture and motion sense image sensor 205 may only need to capture one image (as opposed to a sequence of images) to initiate an image capture with primary image sensor 250.

Figure 4:
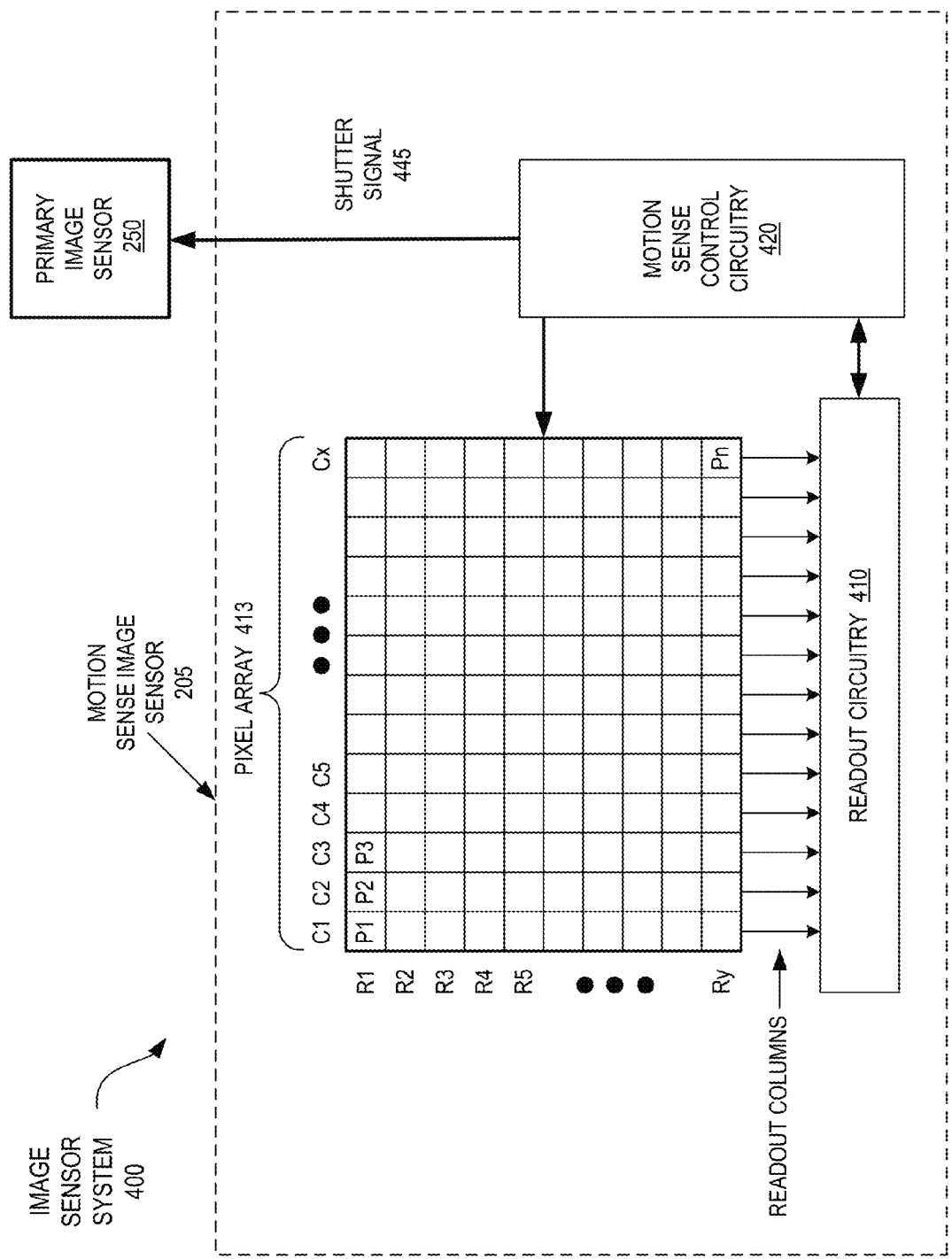
FIG. 4 is a block diagram that illustrates an example image sensor system that includes an example motion sense image sensor and a primary image sensor, in accordance with the teachings of the present invention.

FIG. 4 illustrates an example image sensor system 400 that includes motion sense image sensor 205 and primary image sensor 250, in accordance with the teachings of the present invention. In the illustrated example, motion sense image sensor 205 includes motion sense control circuitry 420 and motion sense control circuitry 420 is coupled to transmit shutter signal 445 to primary image sensor 250. The illustrated motion sense image sensor 205 also includes pixel array 413 and readout circuitry 410, although other configurations are possible.

Pixel array 413 is a two-dimensional array of image sensors or pixels (e.g., pixels P1, P2 . . . , Pn). In one example, each pixel is a complementary metal-oxide-semiconductor ("CMOS") image sensor. In one example, pixel array 413 includes a color filter array including a color pattern (e.g., Bayer pattern or mosaic) of red, green, and blue filters. The color filter array may be disposed over pixel array 413. As illustrated, each pixel is arranged into a row (e.g., rows R1 to Ry) and a column (e.g., column C1 to Cx) to acquire image data of a person, place, or object, which can then be used to render a two dimensional image of the person, place, or object.

After each pixel has acquired its image data or image charge, the image data is readout by readout circuitry 410. Readout circuitry 410 may include amplification circuitry, analog-to-digital ("ADC") conversion circuitry, or otherwise. In one example, readout circuitry 410 may readout a row of image data at a time along readout column lines (illustrated) or may readout the image data using a variety of other techniques (not illustrated), such as a column/row readout, a serial readout, or a full parallel readout of all pixels simultaneously.

In FIG. 4, readout circuitry 410 is coupled to motion sense control circuitry 420. Motion sense control circuitry 420 is coupled to pixel array 413 to control operational characteristic of pixel array 413. For example, motion sense control circuitry 420 may generate a shutter signal or shutter signals for controlling image or video acquisition. In one example, the shutter signal is a global shutter signal for simultaneously enabling all selected pixels within pixel array 413 to simultaneously capture their respective image data during a single acquisition window. In one example, the shutter signal is a rolling shutter signal whereby each row, column, or group of pixels is sequentially enabled during consecutive acquisition windows.

Motion sense control circuitry 420 may be different than a regular control circuitry (not shown) that controls pixel array 413 during a normal image acquisition or imaging mode. For example, motion sense control circuitry 420 may include circuitry configured to generate a shutter signal for only a portion of the pixels in pixel array 413, rather than generating a shutter signal for all or substantially all of the pixels in pixel array 413, as in a regular image acquisition mode. Generating a shutter signal for only a portion of the pixels in pixel array 413 may save power and may enable image acquisition at a high frame rate. Enabling image acquisition at a higher frame rate may also be advantageous to minimize a delay between recognizing a user gesture imaged by motion sense image sensor 205 and initiating an image capture by primary image sensor 250. It is appreciated that motion sense control circuitry 420 may share some electrical components with a regular control circuitry (not shown).

In one example, motion sense control circuitry 420 generates a shutter signal for only a portion of the pixels in pixel array 413 and then controls readout circuitry 410 to read out only the pixels that received a shutter signal. Reading out only a portion of the pixels of pixel array 413 may save time and allow for a greater frame rate (e.g. greater than 30 frames per second). In one example, only a portion of the columns or rows are read out from pixel array 413. Reading out only a portion of the pixels is one potential way of saving power.

Motion sense control circuitry 420 may include a memory for storing images and instructions and a processor for executing instructions. The processor and memory may be shared with a regular control circuitry of motion sense image sensor 205. The processor or other logic within motion sense control circuitry 420 is capable of analyzing image data received from the readout circuitry and analyzing the image data and determining whether a shutter gesture or image capture pattern is present in the image data. If a shutter gesture or image capture pattern is present in the image data, the processor or other control logic may transmit shutter signal 445 to primary image sensor 250. Shutter signal 445 may be an analog signal or a digital signal that includes data (e.g. exposure time) pertaining to capturing a target image.

Figure 5:
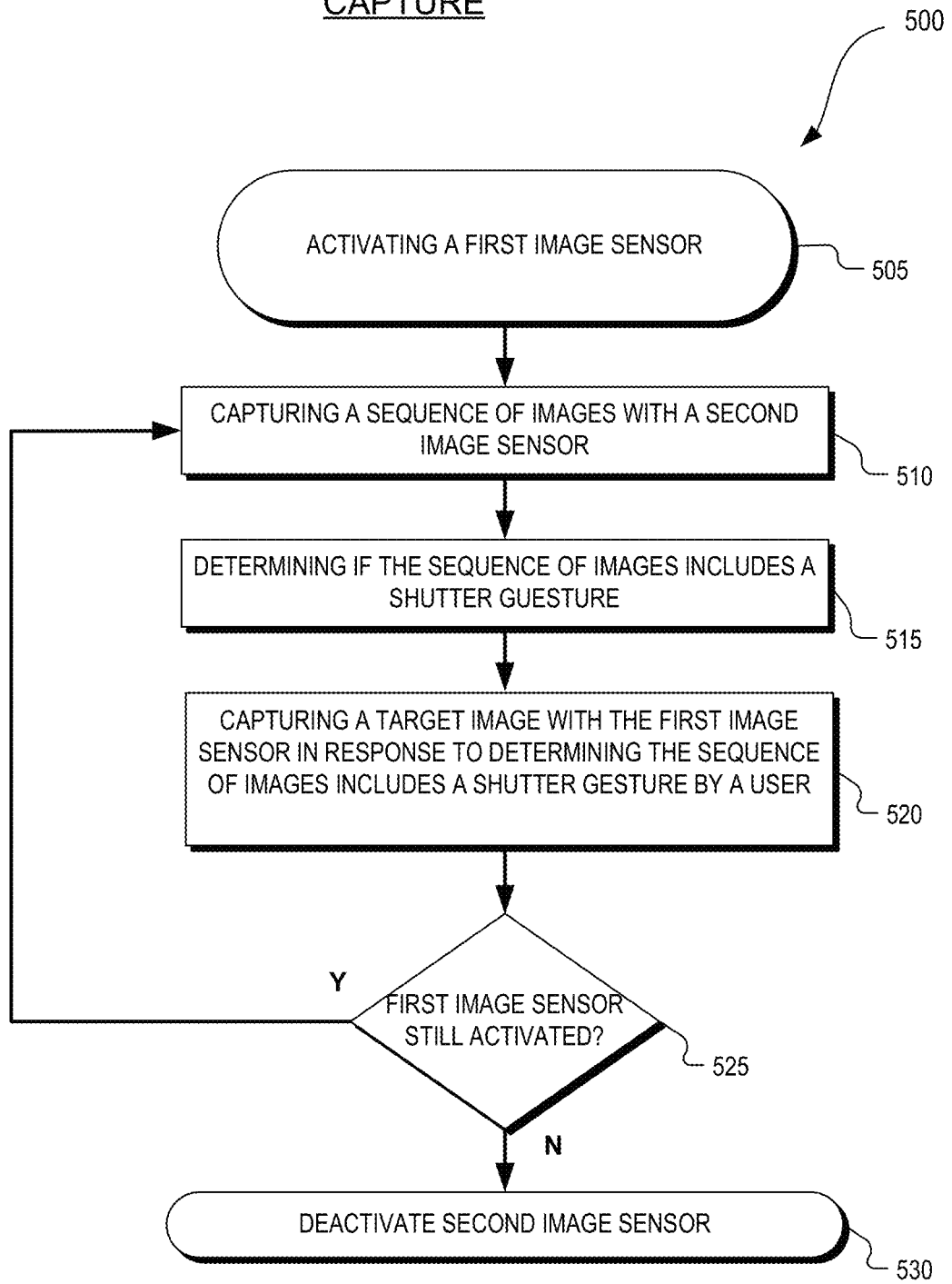
FIG. 5 is a flow chart illustrating an example process of initiating an image capture that includes imaging a shutter gesture from a user, in accordance with the teachings of the present invention.

FIG. 5 is a flow chart illustrating an example process of initiating an image capture that includes imaging a shutter gesture from a user, in accordance with the teachings of the present invention. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In process block 505, a first image sensor (e.g. primary image sensor 250) is activated. A sequence of images (at least two) is captured with a second image sensor (e.g. motion sense image sensor 205), in process block 510. The sequence of images may be captured in a motion sense mode that is different than a regular image capture mode of the second image sensor. The motion sense mode may be an ultra-low power mode that utilizes motion sense control circuitry (e.g. motion sense control circuitry 420) that is different, or partially different from the circuitry that is regularly used to capture images. In process block 515, the sequence of images captured by the second image sensor are analyzed to determine if a shutter gesture was included in the sequence of images. A processor or other logic (e.g. FPGA) determines whether a shutter gesture was included in the sequence of images. In one example, the processor or other logic is included in motion sense control circuitry 420. In one example, a processor analyzes one image captured by the second image sensor for an image capture pattern.

In process block 520, a target image is captured with the first image sensor in response to determining the sequence of images includes a shutter gesture from a user. In the example image sensor system 400, motion sense control circuitry 420 may determine that a shutter gesture was included in the sequences of images and transmit shutter signal 445 to primary image sensor 250. Primary image sensor 250 then captures a target image when it receives shutter signal 445. Shutter signal 445 may control or include an exposure time of the first image sensor to capture the target image and the exposure time may vary based on a category of the image capture pattern from the user. For example some shutter gestures or image capture patterns (e.g. hand signals) may cause primary image sensor 250 to capture images with different exposure times.

In process block 525, process 500 returns to process block 510 if the first image sensor is still activated so that the second image sensor can keep capturing images to analyze for a shutter gesture. If the first image sensor is not still activated (e.g. the user has exited a camera mode or entered another application) the second image sensor is deactivated (process block 530) and it no longer captures images to analyze for shutter gestures.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated examples of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of initiating an image capture of a target image with an image capturing device without initiating the image capture by physically contacting the image capturing device, the method comprising:
    activating a first image sensor for capturing the target image;
    capturing a sequence of images with a second image sensor different from the first image sensor, wherein the first image sensor and the second image sensor are included in the image capturing device and wherein each image in the sequence of images is captured with only a portion of pixels in sectors of the second image sensor;
    determining if the sequence of images captured with the second image sensor includes a shutter gesture performed by a user;
    determining a category of the shutter gesture and selecting an exposure time based on the category of the shutter gesture; and
    capturing the target image at the exposure time with the first image sensor in response to determining the sequence of images captured with the second image sensor includes the shutter gesture from the user.

2. The method of claim 1, wherein the determining if the sequence of images captured with the second image sensor includes the shutter gesture includes:
    acquiring pixel data from different sectors of the second image sensor; and
    analyzing the sequence of images for user initiated movement in relation to the sectors.

3. The method of claim 1, wherein the second image sensor is included in a front facing image sensor on a mobile device that faces a first direction that is approximately opposite to a second direction that the first image sensor faces.

4. The method of claim 3, wherein the first image sensor has a higher pixel resolution than the second image sensor.

5. The method of claim 1, wherein capturing the target image with the first image sensor is in response to the first image sensor receiving a shutter signal from motion-sense control circuitry of the second image sensor, and wherein the motion-sense control circuitry determines if the sequence of images includes the shutter gesture.

6. The method of claim 1 further comprising:
    capturing a second target image with the first image sensor in response to said determining the sequence of images captured with the second image sensor includes the shutter gesture from the user, wherein the second target image is captured subsequent to the target image.

7. An imaging system comprising:
    a first image sensor;
    a second image sensor; and
    control circuitry coupled to transmit a shutter signal to the first image sensor and coupled to receive image data from the second image sensor, wherein the control circuitry includes a non-transitory machine-accessible storage medium that provides instructions that, when executed by the imaging system, will cause the imaging system to perform operations comprising:
    activating the first image sensor;
    capturing a sequence of images with the second image sensor, wherein each image in the sequence of images is captured with only a portion of pixels in sectors of the second image sensor;
    determining if the sequence of images captured with the second image sensor includes an image capture pattern from a user;
    determining a category of the image capture pattern, wherein the shutter signal controls an exposure time of the first image sensor based on the category of the image capture pattern;
    sending the shutter signal from the control circuitry to the first image sensor when the image capture pattern is included in the sequence of images captured with the second image sensor; and
    capturing a target image at the exposure time with the first image sensor in response to receiving the shutter signal from the control circuitry.

8. The imaging system of claim 7, wherein capturing the sequence of images includes acquiring pixel data from different sectors of the second image sensor to create each image in the sequence of images, and wherein determining if the sequence of images captured with the second image sensor includes the image capture pattern includes analyzing the sequence of images for user initiated movement in relation to the sectors.

9. The imaging system of claim 7, wherein the second image sensor is a front facing image sensor on a mobile device that faces a first direction that is approximately opposite to a second direction that the first image sensor faces.

10. The imaging system of claim 7, wherein the image capture pattern is a hand symbol formed by a hand of the user, and wherein the image capture pattern can be determined with one image among the sequence of images.

11. The imaging system of claim 7 including further instructions stored in the non-transitory machine-accessible storage medium, that when executed by the imaging system, will cause the imaging system to perform operations comprising:
    capturing a second target image with the first image sensor in response to receiving the shutter signal from the control circuitry.

12. A non-transitory machine-accessible storage medium that provides instructions that, when executed by an image capturing device, will cause the image capturing device to perform operations that initiate an image capture of a target image without physical contact with the image capturing device to initiate the image capture, the operations comprising:
    activating a first image sensor for capturing a target image;
    capturing a sequence of images with a second image sensor, wherein the first image sensor and the second image sensor are included in the image capturing device, wherein each image in the sequence of images is captured with only a portion of pixels in sectors of the second image sensor;
    determining if the sequence of images captured with the second image sensor includes a shutter gesture from a user;
    determining a category of the shutter gesture and selecting an exposure time based on the category of the shutter gesture; and capturing the target image at the exposure time with the first image sensor in response to determining the sequence of images captured with the second image sensor includes the shutter gesture from the user.

13. The non-transitory machine-accessible storage medium of claim 12, wherein capturing the sequence of images with the second image sensor is facilitated by a motion-sense mode that is different from a regular image capture mode of the second image sensor.

14. The non-transitory machine-accessible storage medium of claim 13, wherein the motion-sense mode includes acquiring pixel data from different sectors of the second image sensor to form each image in the sequence of images, and wherein determining if the sequence of images captured with the second image sensor includes the shutter gesture includes analyzing the sequence of images for user initiated movement in relation to the sectors.

15. The non-transitory machine-accessible storage medium of claim 12 having further instructions that, when executed by the image capturing device, will cause the image capturing device to perform operations comprising:
  capturing a second target image with the first image sensor in response to said determining the sequence of images captured with the second image sensor includes the shutter gesture from the user, wherein the second target image is captured subsequent to the target image.

\* \* \* \* \*